United States Patent [19]

Byers

[11] 4,209,184

[45] Jun. 24, 1980

[54] SELF-LOCKING TRAILER HITCH ASSEMBLY

[76] Inventor: Dwight R. Byers, 16 Buchanan Dr., MCAS, Cherry Point, N.C. 28532

[21] Appl. No.: 938,112

[22] Filed: Aug. 30, 1978

[51] Int. Cl.² .............................................. B60D 1/06
[52] U.S. Cl. .................................... 280/511; 280/508
[58] Field of Search ............... 280/477, 504, 508, 511, 280/512, 513

[56] References Cited

U.S. PATENT DOCUMENTS

| Re. 24,362 | 9/1957 | Nunn | 280/512 |
| 2,853,317 | 9/1958 | Waddle | 280/511 |

Primary Examiner—John J. Love
Assistant Examiner—Randall A. Schrecengost
Attorney, Agent, or Firm—B. B. Olive

[57] ABSTRACT

A standard ball and socket type of trailer hitch assembly is modified so as to provide means for automatically and positively locking the trailer hitch each time the trailer hitch ball is inserted into the trailer hitch socket. The socket receptacle of the trailer hitch is modified to receive a push rod which is actuated by contact with the ball of the hitch and in turn causes the latch to positively lock in place without requiring the operator to remember to move the latch into a positive locking position.

2 Claims, 8 Drawing Figures

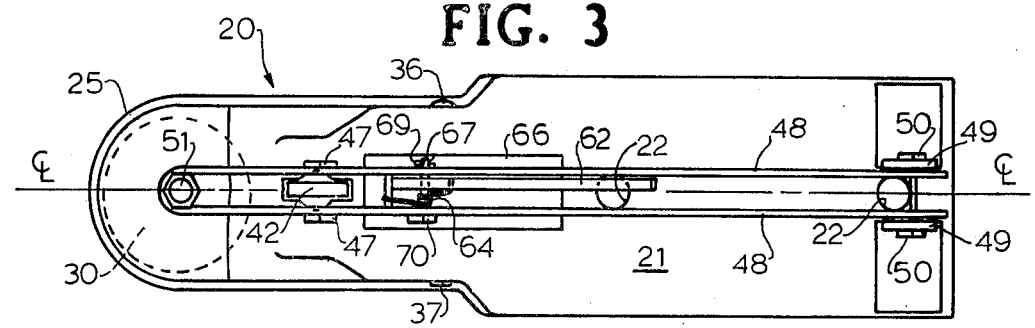
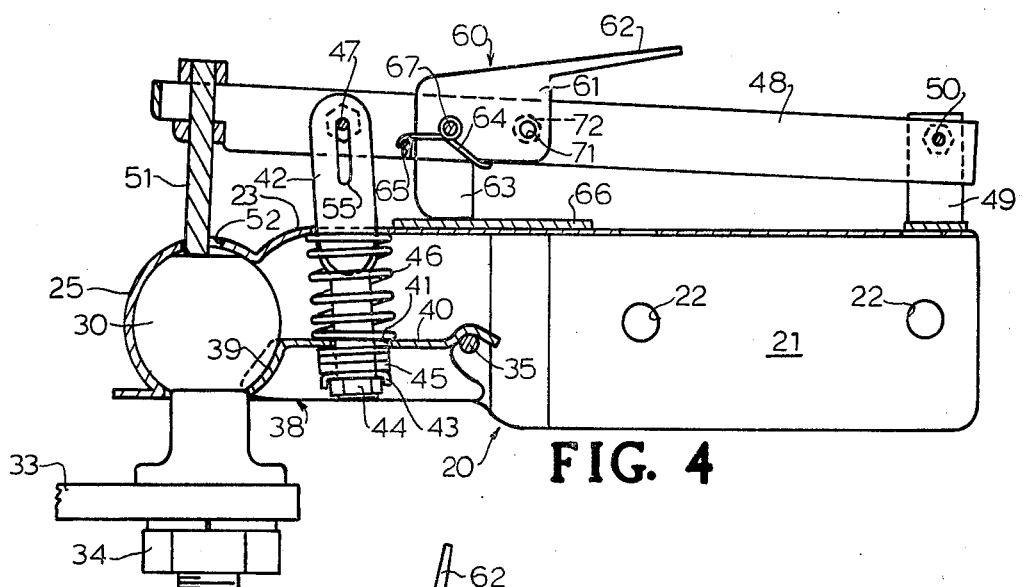
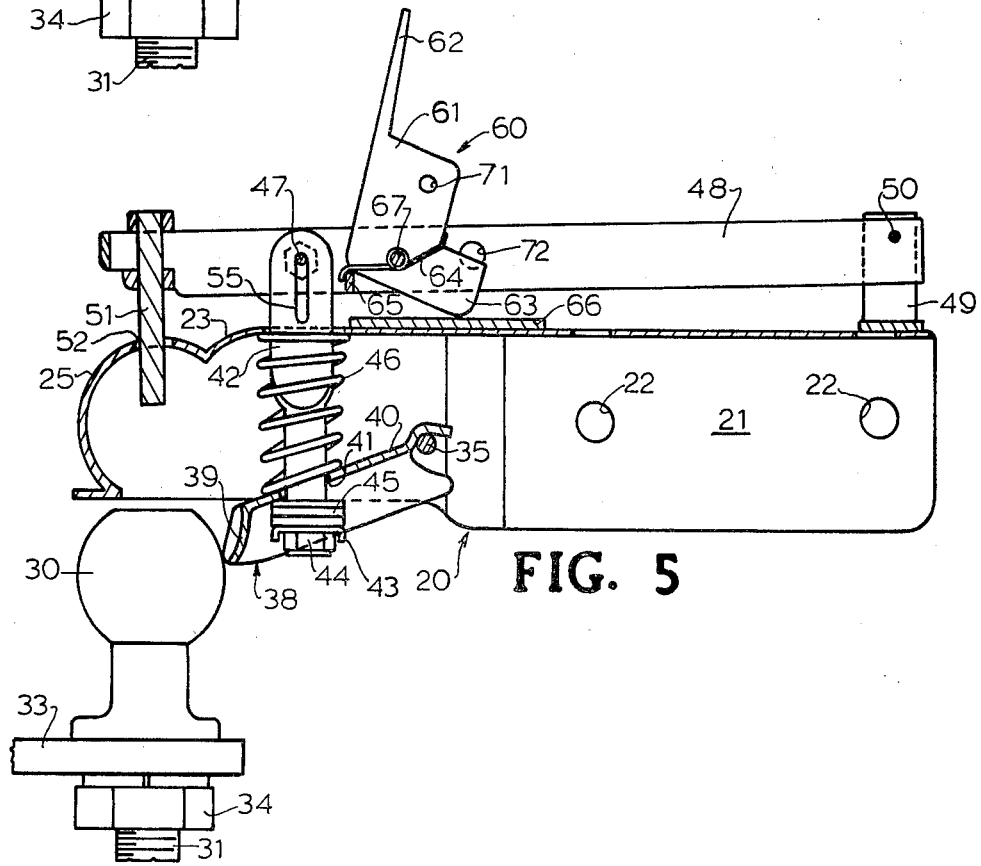

SELF-LOCKING TRAILER HITCH ASSEMBLY

BACKGROUND OF THE INVENTION

1. Field of the Invention

This invention relates to trailer hitch couplings of the ball and socket type and more particularly to an improved coupling wherein the two coupling members are automatically and positively locked against possible separation whenever they are interconnected and without the need for any intervention on the part of the user.

2. Description of the Prior Art:

A common and widely used coupling for trailer hitches consists of a ball member and a socket member having a recess adapted for receiving and engaging the ball member, with the ball member being attachable to the rear end of the hauling vehicle and the socket member to the tongue of the trailing vehicle. A latch is provided on the socket member which is manually movable to engage the ball member and to lock the members together when the coupling is in use. Likewise, the coupling can be disengaged by manual movement of the latch. Typical examples of such type trailer hitches may be found in U.S. Pat. No. 2,726,099 (reissued as U.S. Pat. No. RE. 24,362) and U.S. Pat. No. 2,971,777.

Although these prior trailer hitch couplings are quite satisfactory when properly used, there is always the danger that the user will forget to place the ball latch into final locking position before proceeding to his destination. When this occurs, the likelihood is that the coupling members will become disconnected while the vehicles are in transit which could result in a serious accident.

This problem has received attention but the means previously proposed for overcoming it have not been entirely satisfactory. For example, U.S. Pat. No. 2,855,222 describes a self-locking ball and socket coupling for trailers. However, the mechanism by which this was achieved is quite complicated and requires so many difficult to fabricate parts that construction would be difficult and costly. U.S. Pat. No. 2,726,099 also represents useful background art.

It is therefore an object of this invention to provide an improved self-locking ball and socket coupling for trailers in which the parts are few and simple in configuration and easily manufactured and assembled.

SUMMARY OF THE INVENTION

A trailer hitch of the type having a pressed metal housing with a forward ball receiving socket and a pivotal ball latch member, normally locked in position by a manually operable lever, is modified so that the entry of the ball into the ball socket causes the ball latch member to move automatically into a positive locking position.

In the modified trailer hitch according to the invention, a support arm is mounted on the top surface of the trailer hitch housing and incorporates a plunger rod at its forward end which passes through an aperture in the ball socket. Entry of the ball into the ball socket forces the plunger rod upward which in turn causes the support arm to raise and bring a ball retaining member into engagement with the ball while simultaneously causing a pivotal latch to move into a positive locking position to automatically secure the ball and socket coupling.

DESCRIPTION OF THE DRAWINGS

FIG. 3 is a top plan view of the coupling of FIG. 2.

FIG. 4 is a partial elevation section view taken along the longitudinal center line of FIG. 3 with the coupling locked.

FIG. 5 is a partial elevation section view similar to FIG. 4 but showing the coupling members separated.

DESCRIPTION OF THE PREFERRED EMBODIMENT

Figure 1:
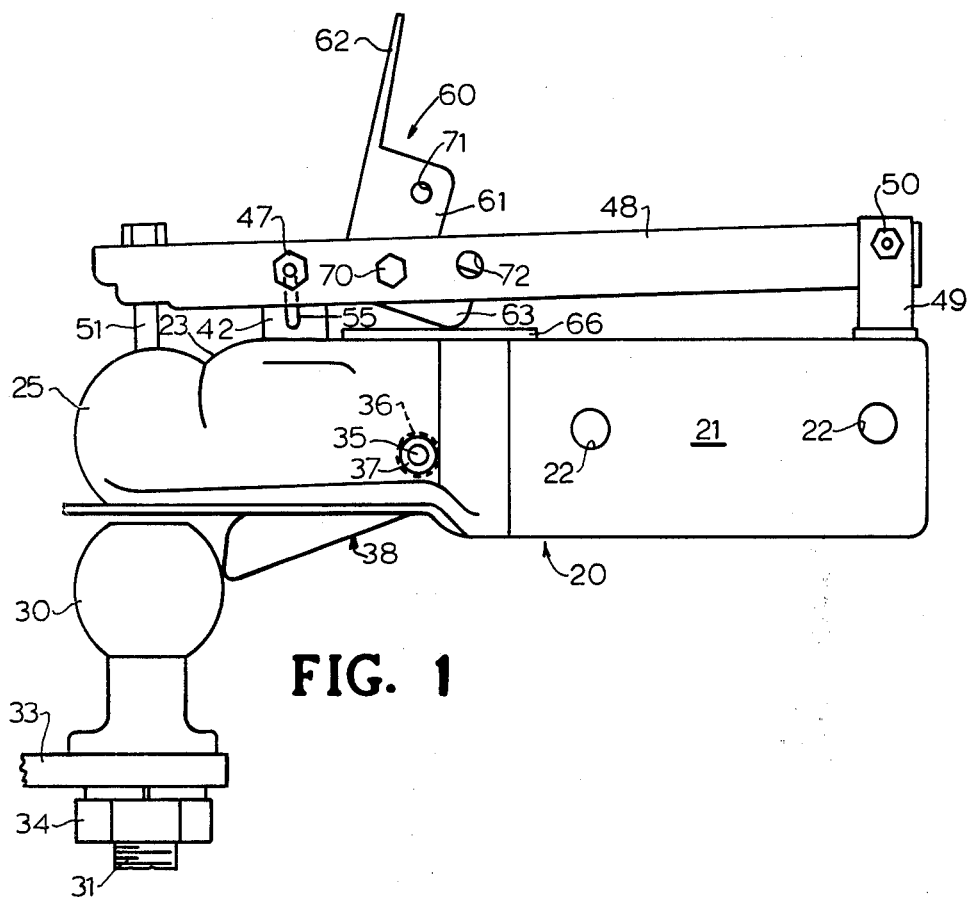
FIG. 1 is a side elevation view of a coupling constructed in accordance with the invention showing an unlocked condition.

The invention described and illustrated herein represents an improvement over prior constructions of the widely used ball and socket type trailer hitch coupling which is especially adapted for application to automobile bumpers or frames and trailer draft tongues.

Referring to the drawings, the improved trailer coupling shown therein by way of illustration includes a conventional stamped metal housing 20 having a tongue receiving portion 21 of channel shape in cross-section with appropriate apertures 22 to receive screws, bolts, and the like, for securement of the draft tongue of a trailer (not shown). The forward portion of the housing 20 includes a formed ball socket 25 adapted to receive a ball member 30 rigidly attached to a screw threaded mounting shank 31 which extends through a suitable opening in hitch member 33 of the towing vehicle and is engaged by a nut 34. Within the housing 20, there is provided a transverse rod 35 extending between the walls thereof which conveniently may be a bolt or rivet swaged in place. The head of such a rivet is seen at 36 and the swaged end at 37. Rod 35 pivotally mounts a ball retainer member designated generally as 38 and best shown in FIG. 5 in lowered position.

Figure 8:
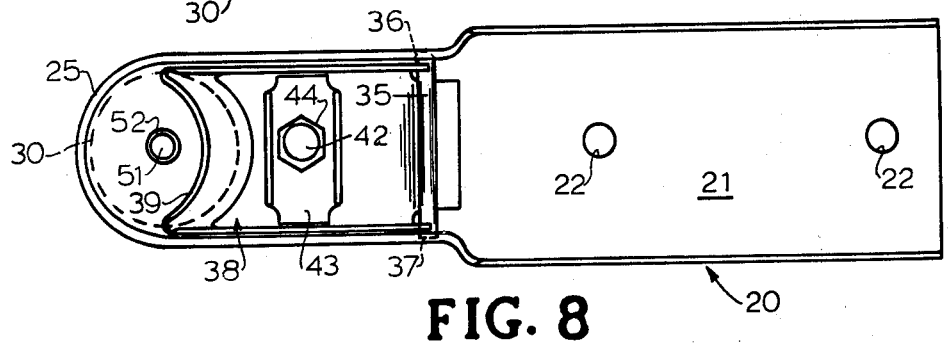
FIG. 8 is a bottom plan view similar to that of FIG. 7 but showing the push rod and ball retaining mechanism in locked position.

The ball retainer 38 which is movably suspended from the fixed pivot rod 35 has its forward wall provided with a spherical recess 39 which is adapted to snugly engage the lower portion of the ball when the ball and socket members 30 and 25 are interconnected. The top wall 40 of the ball retainer has a larger opening 41 and a connecting rod or linkage 42 passes through this opening. Its purpose is to permit raising or lowering of the ball retainer member 38. That portion of connecting rod 42 extending downward below top wall 40 of retainer 38 has its end threaded and mounts a transverse support plate 43 (best shown in FIG. 8) secured to connecting rod 42 by a nut 44. A coil spring 45 of relatively heavy construction is interposed around the rod 42 between the top surface of retainer plate 43 and the top wall 40 of ball retainer 38 and functions to snugly confine the ball member 30 within socket member 25 when the coupling is assembled for normal use. Another somewhat lighter coil spring 46 is interposed around rod 42 between the top wall 40 of the ball retainer 38 and top surface 23 of housing member 20 and serves to swing the retainer away from the ball member 30 when the coupling is disengaged.

In the conventional ball and socket coupling, the connecting rod or link 42 is raised and lowered by virtue of its connection to a manually movable latch member (see U.S. Pat. No. 2,726,099). However, according to the present invention, the upper end of rod 42 is attached by a bolt and nut arrangement 47 to a U-shaped arm member 48 spaced above and extending along the length of housing 20. Arm member 48 has a pivotal mount at the rear end thereof provided by brackets 49 and bolt-nut arrangement 50 with the brackets being welded or otherwise secured to the top surface of housing 20. Slot 55 operates false latching as later discussed.

A push rod 51 is rigidly attached to the forward end of arm member 48 and includes a lower portion designed to pass through an aperture 52 formed in the ball socket member 25 of housing 20. Thus, whenever the ball 30 is positioned within the socket receptacle 25, the top of the ball engages push rod 51 and forces arm member 48 to move in an upward direction. This, in turn, raises connecting rod 42 and causes ball retainer member 38 attached thereto to swing into active position and engage the lower surface of ball member 30 as it moves to a fully seated position (FIG. 4).

Figure 2:
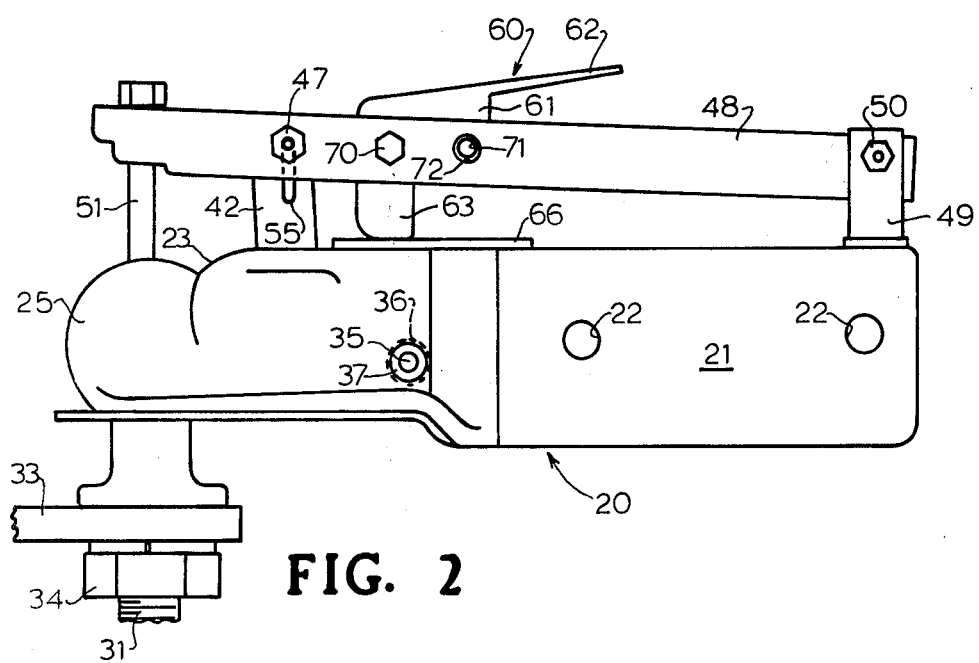
FIG. 2 is a side elevation view similar to FIG. 1 but showing the coupling members interconnected and self-locked.
Figure 7:
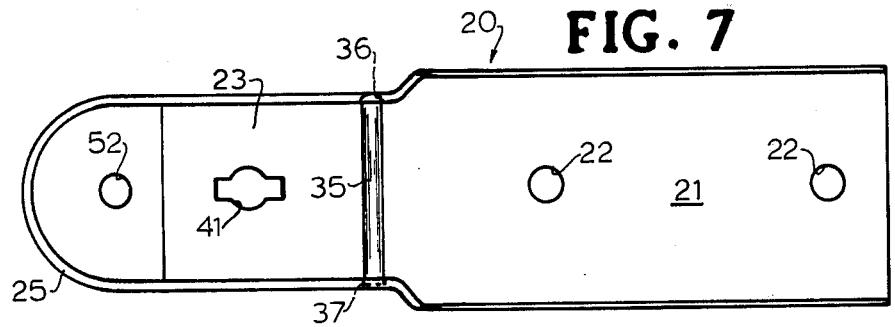
FIG. 7 is a bottom plan view of the coupling housing.

In order to automatically lock the coupling in the engaged position, a latch generally designated by the numeral 60 is provided. Latch 60 includes a crank arm having an upper portion 61, an integral handle member 62 and a lower portion 63 and pivots on pivot pin 67, which in turn mounts on pivotal arm member 48 and is retained by head 70 and cotter pin 69. A spring 64 is coiled around pivot pin 67 with one free end being secured to the lower portion 63 of latch member 60 and the other being secured to a transverse abutment 65, which is welded or otherwise securd to arm member 48. This spring functions to constantly urge the lower portion 63 of latch member 60 towards the abutment 65 when arm member 48 is in raised position following insertion of ball 30 in ball socket 25. The latch member 60, associated spring 64 and abutment 65 are best shown in FIGS. 4 and 5. It will also be observed on examination of these figures as well as from FIG. 1 and FIG. 2 that a wear plate 66 is positioned on the top surface of housing 20 to provide a wear surface for the lower end of latch 60 to slide on as it moves in and out of locking position.

It is apparent then from the foregoing description of the device that insertion of ball 30 into socket member 25 forces push rod 51 upward which in turn raises arm member 48 to which the push rod is attached. Likewise, retainer member 38 is brought into engagement with ball member 30 as arm 48 is rasied by virtue of its attachment to link rod 42 which in turn is connected to arm member 48 and moves upward therewith against the tension of its associated springs 45 and 46. Finally, the raising of arm member 48 causes latch member 60 to automatically rotate about transverse pivot pin 67 into a position which locks the coupling in place. Release of the lock to disengage the coupling is readily accomplished by merely grasping the handle member 62 of latch assembly 60 and moving it in an upward direction against the tension of spring 64.

Figure 6:
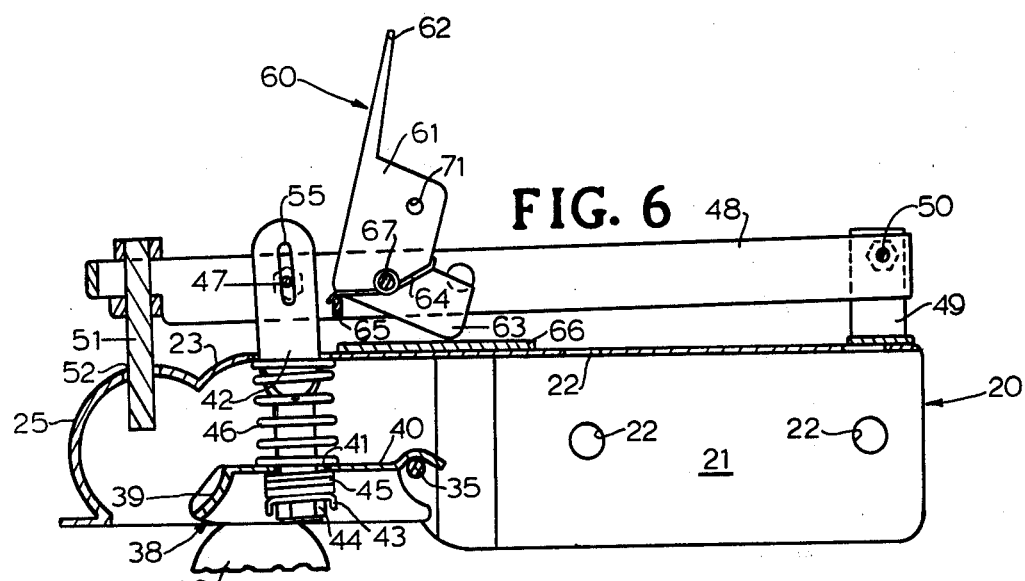
FIG. 6 is a partial elevation section view similar to FIGS. 4 and 5 but illustrating how the ball retainer and connecting rod may be moved into a locked position with the latch remaining in a non-locked position.

In some instances, the operator may inadvertently place the ball 30 beneath ball retainer member 38 rather than in socket 25 as illustrated in FIG. 6. To avoid giving the operator a false latching indication in this situation the slot 55 in which the bolt and nut arrangement 47 is mounted allows the connecting rod 42 to rise, as in FIG. 6, but without causing latch member 60 to latch as in FIG. 6 and as could otherwise be the case.

Thus, it is seen that the invention provides a reliable and simple means for the self-locking of a ball and socket type of trailer coupling which can be conveniently released when it becomes necessary to disconnect the coupling members. Although the self-locking mechanism provides an efficient and safe securement of the coupling when engaged, in order to avoid any unauthorized tampering with locking latch 60, an aperture 71 is provided in the upper portion 61 thereof which aligns, when the latch is in locked position, with aperture 72 formed in arm member 48 to provide a passageway for receiving a padlock, or the like, to secure the locked latch against manual release.

It is believed that the invention will be understood from the foregoing without the need for further description and that while a preferred embodiment has been shown and described for illustrative purposes, the invention is limited only by the appended claims.

What is claimed is:

1. A trailer coupling comprising:
   (a) a ball member attachable to a towing vehicle;
   (b) a socket member comprising a generally elongated channel-like housing attachable to a towed vehicle and formed with a shaped socket at the forward end thereof having an aperture formed in an upper central portion thereof and being adapted to receive said ball member with the top thereof positioned below said aperture to establish a draft connection between the towing and towed vehicles;
   (c) a ball retainer member pivotally supported within said housing rearward of said socket and pivotal towards said socket to retain said ball member therein and away from said socket to allow said ball member to be removed therefrom;
   (d) a vertical push rod slidably mounted in said socket aperture and positionably downwardly to have its lower end engage the top of said ball member when entering said socket and positionable upwardly by said ball member as said ball member seats in said socket;
   (e) a vertical connecting rod extending above and through an aperture formed in said housing rearward of said socket and having its lower end cooperable with said ball retainer member to move said ball retainer member towards and away from said socket;
   (f) linkage means mounted above said housing connecting the upper ends of said push rod and said connecting rod and enabling said push rod when moving vertically upwardly in engagement with the top of said ball member as said ball member moves into said socket to transmit such push rod motion through said linkage means to said connecting rod to effect a comparable upward movement of said connecting rod to cause said ball retainer member to move towards said ball member and into locking relation therewith; and
   (g) a bell crank shaped cam lever pivotally mounted on said linkage means and being latching engageable with the top surface of said housing to positively and automatically lock said linkage means and ball retainer means in locked positions when said ball member is fully seated in said socket and being disengageable to allow said ball member to be released from said socket, the connection between said linkage means and connecting rod being further adapted so as to enable said ball retainer member to move into locking position without causing repositioning of said linkage means or latching of said cam member whenever said ball retainer member is inadvertently struck from beneath by said ball member.

2. An automatically self-locking trailer coupling of the ball and socket type comprising:

(a) a ball member attachable to a towing vehicle;

(b) a housing member having at a forward end a formed socket adapted to receive said ball member and having at a rearward end thereof a formed channel portion adapted to receive and be secured to a tongue member attachable to a trailing vehicle, said socket having an aperture formed in an upper central portion thereof and being adapted to receive said ball member with the top of said ball positioned below said aperture to establish a draft connection between the towing and towed vehicles;

(c) an arm member extending centrally of the width, along the length and spaced above the upper surface of said housing member and having a pivotal mount at the rear end of said housing for pivoting about a horizontal axis spaced above and extending across said housing;

(d) a vertical push rod member having an upper end connected to the forward end of said arm member and positioned to slidably extend through said socket aperture to enable said ball member to strike the lower end of said rod member and force said push rod member in an upward direction when said ball is inserted and seated in said socket and to cause said arm member to pivot upwardly about said pivotal mount;

(e) ball retainer means including a ball retainer member supported within said housing and positioned to the rear of said socket and a transverse mounting rod pivotally mounting a trailing end portion of said ball retainer member and fixedly secured to and within the walls of said housing, said ball retainer member further characterized by the presence of a shaped aperture in an upper surface thereof and the provision of a spherical recess in the forward end thereof adapted to snugly engage the lower portion of said ball member when said ball member is positioned within said socket and said ball retainer member pivoted towards said recess to retain said ball member therein and away from said recess to allow said ball member to be removed therefrom;

(f) a spring biased connecting rod having an upper end connected to an intermediate portion of said arm member by means providing both a pivotal connection enabling said arm to lift said rod and a predetermined amount of free vertical travel enabling said rod to slide upwardly on said arm member for the amount of said travel, and a lower end extending through said shaped aperture in the upper surface of said ball retainer member with enlarged means thereon for preventing the withdrawal thereof from said aperture, having first coil spring means located on said rod between said housing and ball retainer member and biasing said retainer member open and second spring means located on said rod below said ball retainer member and supported on said enlarged means for biasing said retainer member closed, said spring-biased connecting rod being adapted for reciprocal movement in correspondence with the pivotal movement of said arm member to thereby cause said ball retainer member to become engaged with and disengaged from said ball member when inserted in said socket with engagement being accomplished against spring bias provided by said first spring means and disengagement under normal bias of the said first spring means; and (g) a latch member shaped as a bell crank lever positioned behind said connecting rod and mounted for pivoting on and around a horizontal axis extending through said arm member, said latch member having a cam portion engageable with the top surface of said housing member for raising and lowering said arm member and spring means mounted on and operatively associated with said latch and arm members and adapted to urge said latch and arm members in positively locked positions upon said push rod member being forced upwardly by entry of said ball member into said socket to effect an automatic and positive self-locking of the resulting ball and socket coupling and having a lever portion adapted for manual manipulation to move said latch member cam portion out of the locked position to lower said arm member and ball retainer means in positions which permit release of said ball member from said socket and a subsequent re-insertion of the ball member into said socket and wherein said connecting rod slidable travel enables said ball retainer member to move into locking position without causing upward pivoting of said arm member or latching of said latch member whenever said ball retainer member is inadvertently struck from beneath by said ball member.

* * * * *

UNITED STATES PATENT AND TRADEMARK OFFICE
CERTIFICATE OF CORRECTION

PATENT NO. : 4,209,184
DATED : June 24, 1980
INVENTOR(S) : Dwight R. Byers

It is certified that error appears in the above—identified patent and that said Letters Patent is hereby corrected as shown below:

Col. 2, line 36, 1st occurrence of "of" should be --to--.

Col. 2, line 54, "larger" should be --large--.

Col. 3, line 38, "securd" should be --secured--.

Col. 3, line 55, "rasied" should be --raised--.

Col. 4, line 42, "downardly" should be --downwardly--.

Signed and Sealed this

Eighteenth Day of November 1980

[SEAL]

Attest:

SIDNEY A. DIAMOND

Attesting Officer

Commissioner of Patents and Trademarks